United States Patent
Ackerman et al.

(10) Patent No.: US 6,545,788 B1
(45) Date of Patent: *Apr. 8, 2003

(54) MULTIPLE PATH DIGITAL WAVELENGTH STABILIZATION

(75) Inventors: David Alan Ackerman, Hopewell, NJ (US); Scott L. Broutin, Kutztown, PA (US); James Kevin Plourde, Allentown, PA (US); George John Przybylek, Douglasville, PA (US); John William Stayt, Jr., Schnecksville, PA (US)

(73) Assignee: Agere Systems, Inc., Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/451,079

(22) Filed: Nov. 30, 1999

Related U.S. Application Data

(63) Continuation-in-part of application No. 09/265,291, filed on Mar. 9, 1999.

(51) Int. Cl.⁷ .................. H04B 10/00; H04B 10/04; H04B 10/18
(52) U.S. Cl. .................. 359/187; 372/32; 359/110
(58) Field of Search .................. 372/32; 359/187

(56) References Cited

U.S. PATENT DOCUMENTS

| | | | | |
|---|---|---|---|---|
| 5,299,212 A | * | 3/1994 | Koch et al. | 372/20 |
| 5,390,203 A | * | 2/1995 | Miller | 372/106 |
| 6,154,474 A | * | 11/2000 | Yoshida | 372/32 |
| 6,384,947 B1 | * | 5/2002 | Ackerman et al. | 359/127 |

FOREIGN PATENT DOCUMENTS

WO     WO9705679     2/1997

OTHER PUBLICATIONS

Santec Technical Note—Optical Wavelength Locker/Monitor OWL–10.

B. Villaneuve, H.B. Kim, M. Cyr, and D. Gariepy—A Compact Wavelength Stabilization Scheme for Telecommunication Transmittors.

\* cited by examiner

Primary Examiner—Leslie Pascal
Assistant Examiner—Agustin Bello
(74) Attorney, Agent, or Firm—Synnestvedt & Lechner LLP

(57) ABSTRACT

A method and apparatus for stabilizing the wavelength of a laser are disclosed. The invention provides a way to stabilize a laser for applications in dense wavelength division multiplexing (DWDM) systems where frequency spacing is crucial. The invention accomplishes laser stabilization by generating one or more optical paths which are passed through one or more filters to obtain one or more signals which are a function of frequency. Another optical path which does not contain a filter is generated to obtain a signal which is a function of power. The frequency signal(s) and the power reference signal are then converted from optical to electrical and from analog-to-digital. A microcontroller is then used to normalize one or more selected frequency paths with respect to the optical power path, process the signals via software code, and generate a signal which provides feedback to the laser for stabilization. By using a microcontroller; elements that lead to wavelength or frequency drift, or manufacturing component variations can be taken into account and the input signal to the laser can be adjusted accordingly.

35 Claims, 6 Drawing Sheets

MULTIPLE PATH DIGITAL WAVELENGTH STABILIZATION

RELATED APPLICATIONS

This application is a continuation-in-part of co-pending U.S. application Ser. No. 09/265,291 to Ackerman et al., entitled "Two Path Digital Wavelength Stabilization," filed Mar. 9, 1999, having at least one common inventor, which is incorporated herein by reference.

FIELD OF THE INVENTION

The present invention relates to a novel and useful method for stabilizing the wavelength of a laser source.

BACKGROUND OF THE INVENTION

Laser sources are widely used in wavelength division multiplexed systems. In wavelength division multiplexed systems, it is important that the wavelength used is very stable. Although lasers are inherently very stable, increased stabilization of a laser's wavelength becomes crucial as systems migrate to dense wavelength division multiplexing (DWDM) types. In DWDM systems, many wavelengths are placed on a single fiber to increase system capacity. Currently the spacing in DWDM systems between frequencies is around 100 GHz and can be handled by traditional laser stabilization methods. However, as technology moves toward frequency spacings of 25–50 GHz or less, increased stabilization will be required to prevent interference between wavelengths as the spacings become closer and closer.

Presently, to wavelength stabilize lasers, the wavelength or equivalently the optical frequency of a laser is compared to a stable reference element. One method is to use an optical filter as a reference element. The output of the laser is split and part of the beam is passed through an optical filter to create an optical signal which is a function of wavelength or frequency and optical power (hereinafter "the optical filtered path"). The optical filtered path is then processed, assuming that a change in signal amplitude corresponds to a change in frequency, and a signal is generated which is fed back to the laser to stabilize the laser's wavelength. However, a change in signal amplitude at the output of the filter could be the result of a change in the power output of the laser rather than a change in the laser's frequency.

Another method of stabilizing a laser is to pass a slightly diverging beam of light, obtained by splitting the output of the laser source, through a filter at different angles of inclination as shown in FIG. 1. The two photo-detectors, $P_1$ and $P_2$, act as apertures and capture a different portion of the light emitted by the divergent source. This produces two different spectral responses, offset in wavelength according to their angular difference with respect to the filter. Since $P_1$ captures a portion of the emitted light which passed through the filter at a higher tilt angle than that captured by $P_2$, it's response will peak at a slightly lower wavelength than $P_2$ as depicted in FIG. 2. The filter and alignment parameter are chosen so that the wavelength offset between the two responses is roughly equal to their effective bandwidths. The signals are then compared differentially to generate a signal which can be used to stabilize the wavelength of the laser by maintaining $\lambda = \lambda_0$, low as further depicted in FIG. 2.

In a stabilized system, wavelength or frequency drift can be introduced by the aging or temperature dependence of the laser itself, or by the aging or temperature dependence of the optical reference filter, the optical detectors, or the stabilization electronics. In addition, manufacturing variations of system components can result in varying wavelengths from system to system. Existing systems are unable to adequately compensate for the multitude of variables that can arise in a stabilization system when a very high level of stabilization is needed.

SUMMARY OF THE INVENTION

The present invention provides an improved method for stabilizing the wavelength of a laser source. The invention accomplishes this objective by using one or more optical filters, multiple optical paths, analog and digital conversion, and a microcontroller.

In accordance with the present invention, a laser generates a signal which is carried by a fiber optic cable. Two separate paths are created from the fiber optic cable via photocouplers. The first path is an optical filtered path which passes through an optical filter. The second path is a power reference path used for normalization. Since the optical filtered path contains an optical filter, it provides a signal the power of which is a function of wavelength as well as the optical power output of the laser. The power reference path is unfiltered so as to provide a signal the power of which is a function only of the optical power output of the laser. A change in the output power of the optical filtered path should primarily indicate a frequency change of the laser. However, the change may be due to a change in the optical power of the laser. By normalizing the optical filtered path to the power reference path, the change in power in the optical filtered path that is due to frequency change rather than laser output power change can be isolated and used to stabilize the frequency of the laser source.

More than one optical filtered paths containing one or more optical filters may be used in place of the single optical filtered path. The microcontroller utilizes one or more of the available optical filtered paths for processing. This arrangement allows the microcontroller to choose a desirable optical filtered path signal or to combine the signals from two or more optical filtered paths to achieve a desirable signal. By allowing the microcontroller to choose a desirable signal or to combine signals to achieve a desirable signal, the effects of undesirable optical filtered path signals can be minimized.

DETAILED DESCRIPTION OF THE INVENTION

Figure 1:
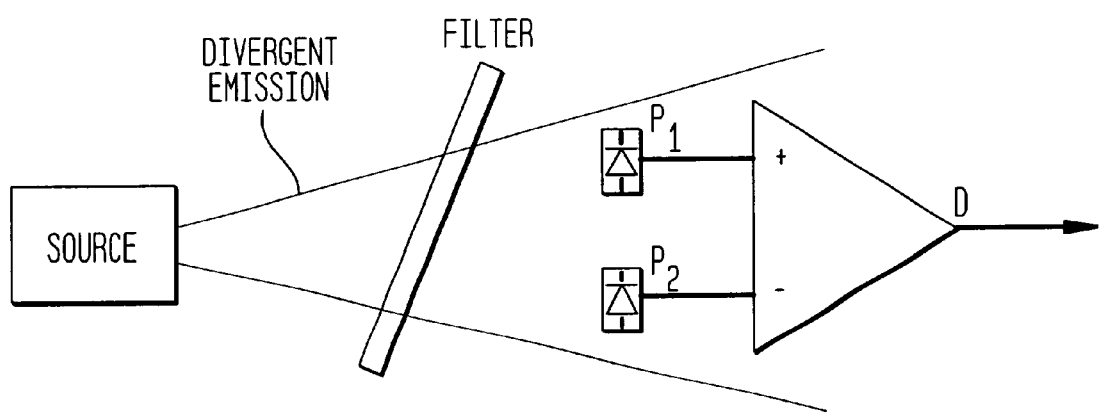
FIG. 1 is a block diagram of a two-path wavelength stabilization system in accordance with the prior art.
Figure 2:
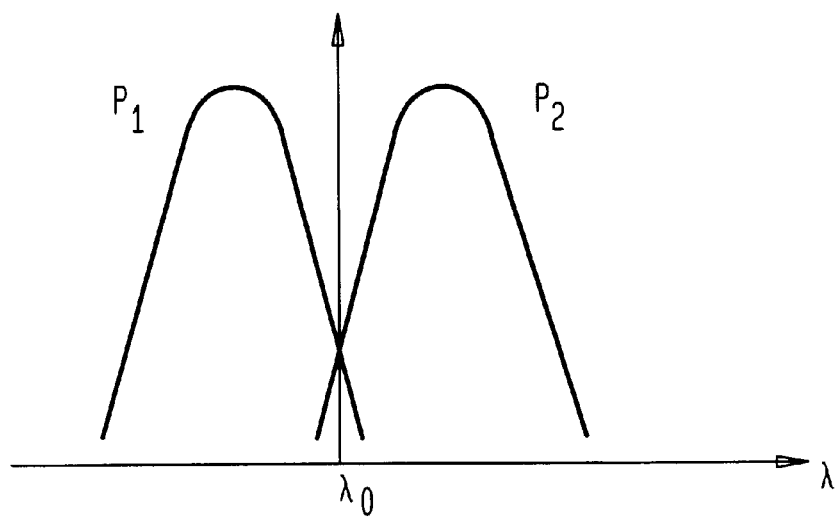
FIG. 2 is a graph depicting signal amplitude vs. wavelength of the signals at the photo-detectors, $P_1$ and $P_2$, in the circuit of FIG. 1.
Figure 3:
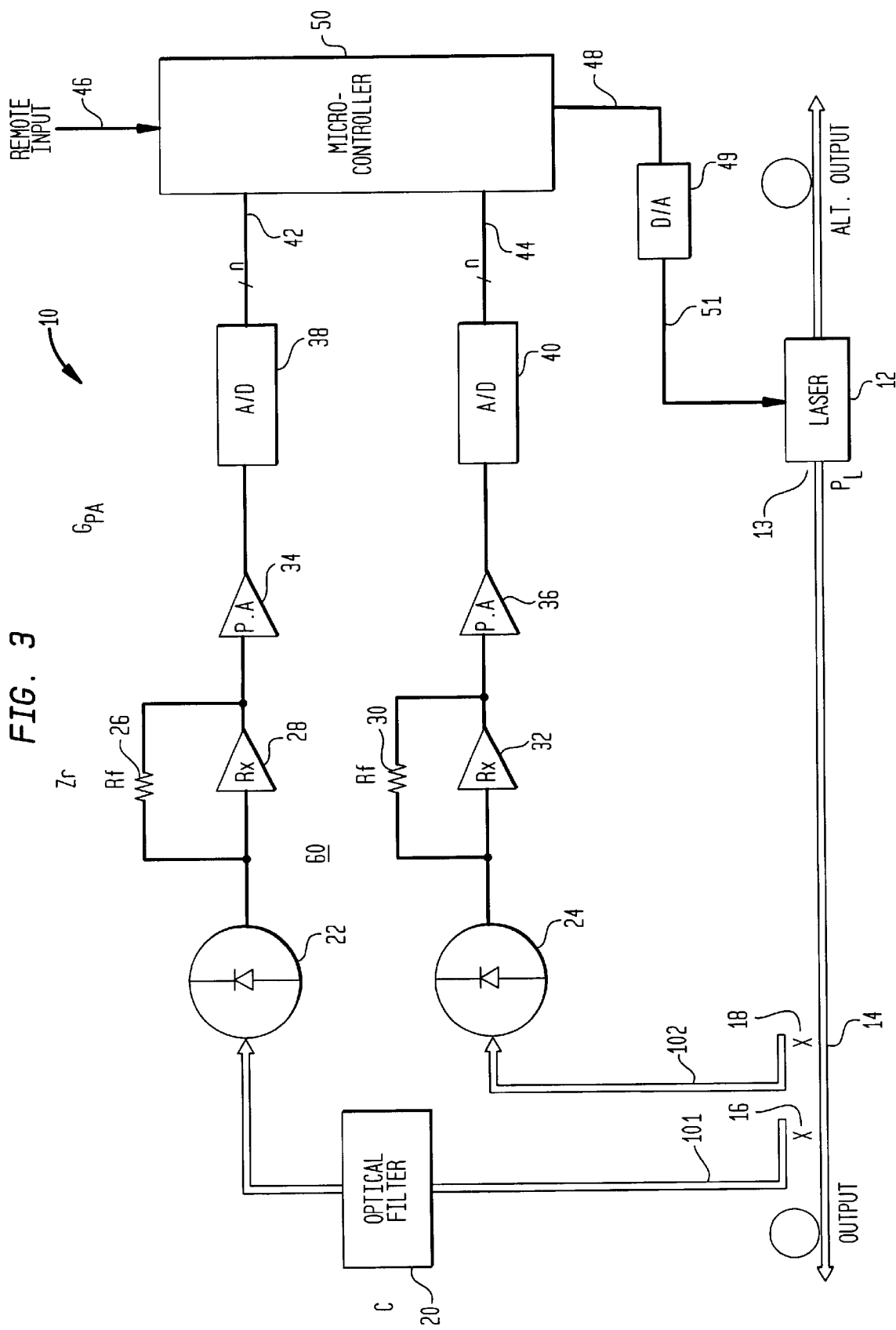
FIG. 3 is a block diagram of a two-path wavelength stabilization system in accordance with the present invention.

Referring more specifically to the drawings, in FIG. 3, an embodiment of a multiple path wavelength stabilization system is depicted. FIG. 3 illustrates the components of a two path wavelength stabilization system 10 which include: a laser source 12, an optical fiber 14, photo couplers 16 and 18, an optical filter 20, photo detectors 22 and 24, current-to-voltage converters 28 and 32, amplifiers 34 and 36, analog-to-digital converters 38 and 40, microcontroller 50, and digital-to-analog converter 49. The components connected together, as depicted in FIG. 3, provide increased stabilization for a laser to be used in dense wavelength division multiplexing (DWDM) systems or similar systems where very stable laser frequencies are required. The output 13 from either the front face or the back face of the laser 12 produces a signal having a power $P_L$ which is placed on the fiber optic cable 14. The initial signal on the fiber optic cable is then used to create two independent paths, the optical filtered path 101 and the power reference path 102. The optical filtered path 101 and the power reference path 102 are created by placing photo-couplers 16 and 18, respectively, on the fiber optic cable 14 carrying the signal from the laser 12. The optical filtered path 101 is passed through an optical filter 20 to obtain a signal which is, at least partially, a function of wavelength or frequency, and becomes a reference element for frequency stabilization. The power reference path 102 does not pass through the optical filter 20 and provides a signal which is a function solely of the laser's optical power PL, and is eventually used for normalizing the optical filtered path 101.

The optical filtered path 101 and the power reference path 102 are then processed to provide suitable signals for the microcontroller 50. Separately, each path passes through a photo-detector 22 or 24, current-to-voltage converter 28 or 32, amplifier 34 or 36, and analog-to-digital converter 38 or 40.

The photo-detectors 22 and 24, transform the optical signal from each path into an electrical signal which is required as an input for electrical circuits. The photo-detectors 22 and 24 produce an electrical current which is a function of the optical signal strength. The conversion or responsivity of the photo-detectors 22 and 24 is, for example, roughly 1 ampere of electrical current for each watt of optical power. Assuming the optical power into the photo-detectors 22 and 24 is 1 $\mu$W, the initial electric current out of the photo-detectors 22 and 24 is in the neighborhood of 1 $\mu$A.

Figure 4:
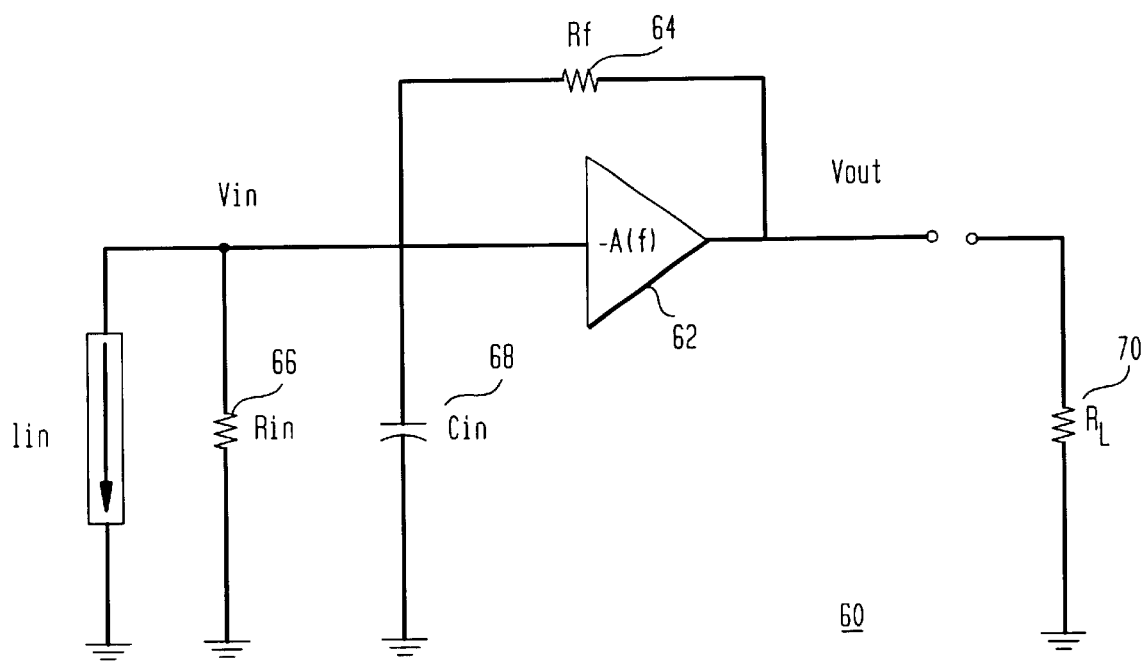
FIG. 4 is a circuit diagram of an exemplary pre-amplifier and current-to-voltage converter for use in the circuit of FIG. 3.

The current-to-voltage converters 28 and 32, convert the output of the photo-detectors 22 and 24 from a signal represented by a current to one represented by a voltage and a provide some pre-amplification. The conversion of the signal from current to voltage and the signal's pre-amplification is combined as depicted in FIG. 4. In FIG. 4, a current signal, $i_{in}$, is amplified and transformed into a voltage signal, $v_{out}$. The amplification and current to voltage transformation is accomplished by a transimpedance amplifier 60 created by using an inverting amplifier 62 with resistor 64 in a feedback loop. If a 100 k$\Omega$ resistor is used for feedback resistor 64, the output voltage $v_{out}$ will be approximately the input current, $10^{-6}$A, times the feedback resistance, 100 k$\Omega$, or about 0.1 V.

Figure 5:
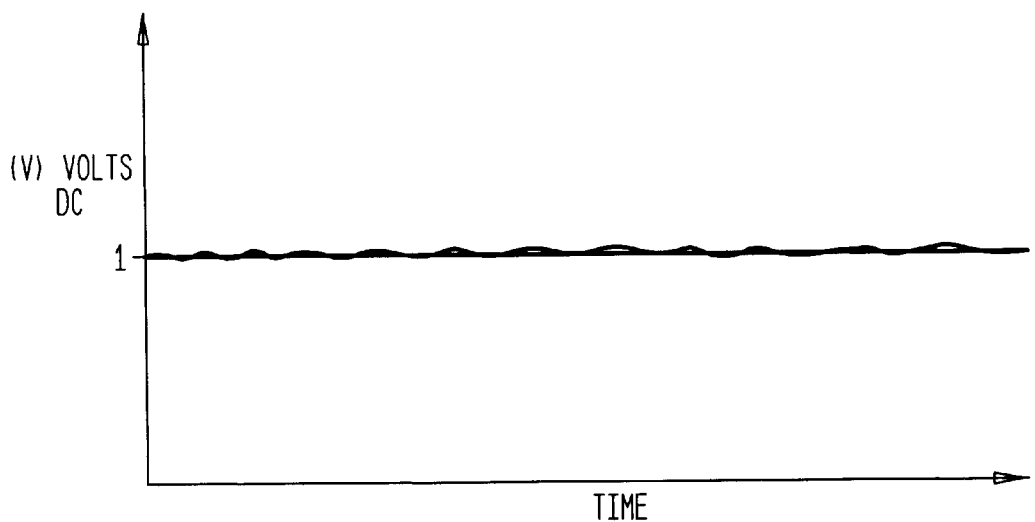
FIG. 5 is a graph of the voltage level in the optical filtered path prior to analog-to-digital conversion in accordance with the present invention.
Figure 6:
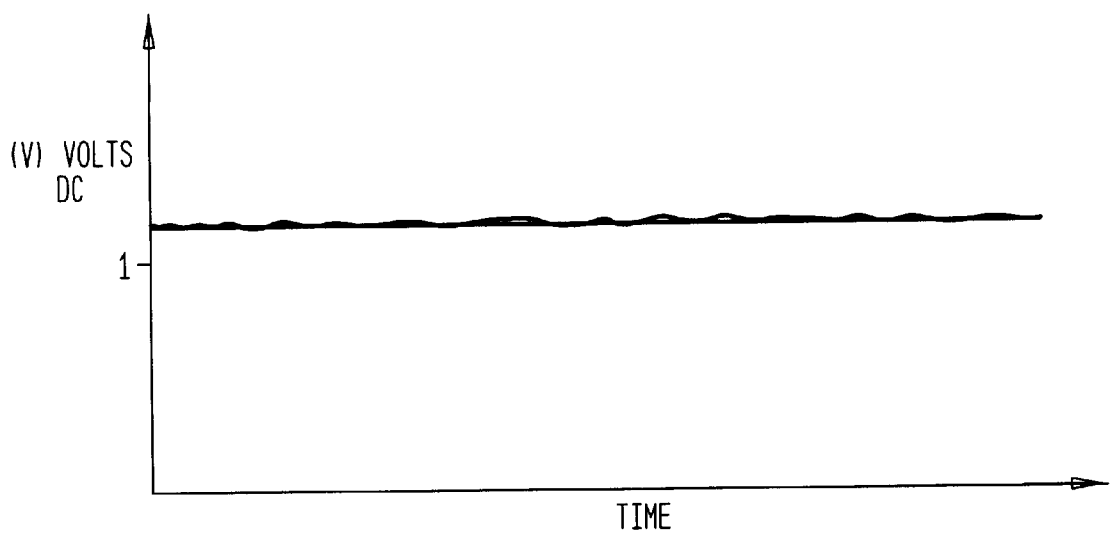
FIG. 6 is a graph of the voltage level in the power reference path prior to analog-to-digital conversion in accordance with the present invention.

The amplifiers 34 and 36, provide additional gain to the signal to condition the signal for the analog-to-digital converters 38 and 40. If the amplifiers 34 and 36 provide a gain of 10, the signals will be approximately 1 V as they enter the analog-to-digital converters. FIGS. 5 and 6 depict the signals on the optical filtered path and the power reference path, respectively, prior to entering the analog-to-digital converters 38 and 40. As can be seen in the figures, at this point, the signals are DC voltages carrying some noise with the voltage of the optically filtered path 101 slightly lower than the voltage of the unfiltered path 102. This example assumes that the components in the two paths are matched (which, of course, is not a requirement).

The analog-to-digital converters 38 and 40 convert the input analog signals to digital signals. The resultant digital signals 42 and 44 are in a form which can be processed and manipulated by the microcontroller 50.

The digital signals 42 and 44 are then processed by the microcontroller 50, which produces the output signal 48. The microcontroller 50 numerically divides the optical filtered path digital signal 42 by the power reference path digital signal 44 to normalize the optical filtered path digital signal 42, whereby a digital value which is a function solely of the laser's wavelength is derived. The microcontroller can then use the digital value representing the laser's wavelength to generate signal 48. Signal 48 is then converted from digital to analog by digital-to-analog converter 49 to produce a laser adjustment signal 51 which can be used for adjusting the wavelength of the laser 12. The processing by microcontroller 50 can be accomplished by any of the following types of apparatus: microprocessor, processor, digital signal processor, computer, state machine, or essentially any digital processing circuit.

The signal 51 can be in any form desired for controlling the frequency of the laser 12 and can be modified by changes in the microcontroller's software code via remote input 46. The signal 51 generated through the digital-to-analog converter 49 by the microcontroller 50 may be a current for adjusting the temperature of a thermoelectric cooler on which the laser 12 is mounted, or the microcontroller 50 may generate other appropriate signals either with or without digital to analog conversion depending on the method used to modify the frequency of the laser 12.

Figure 3A:
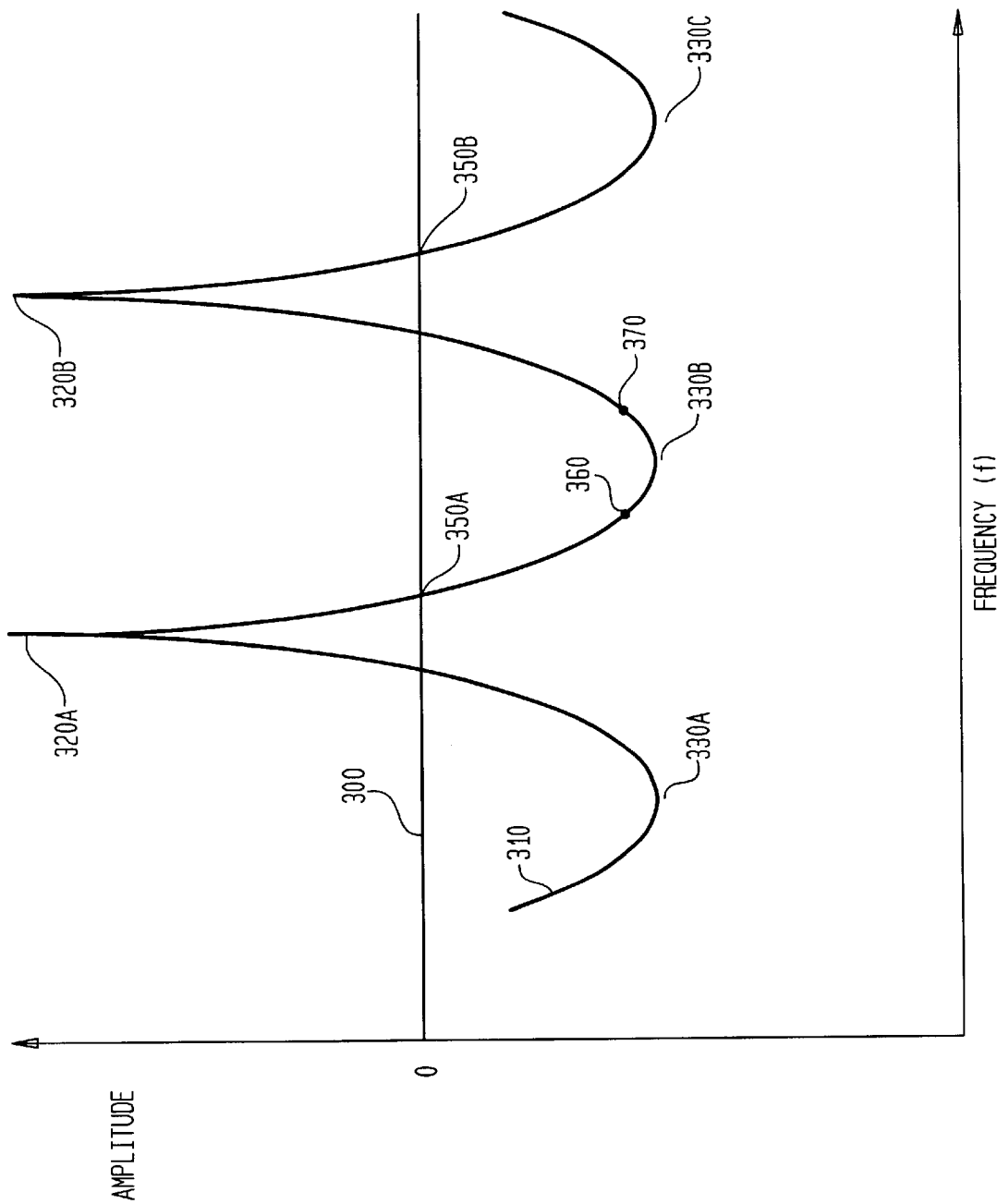
FIG. 3A is a graph of the output intensity of an etalon versus frequency, normalized to a reference amplitude.

In a preferred embodiment, optical filter 20 is an etalon. However, optical filter 20 may be any device which produces a measurable output that varies based on the frequency of an optical input. An etalon is a piece of partially reflective glass which produces an interference pattern when light containing many different frequencies passes through the etalon. FIG. 3A depicts the output amplitude 310 of an etalon versus frequency, normalized to a reference amplitude 300. The interference pattern 310 created by the etalon is characterized by a plurality of peaks 320A and 320B, and a plurality of cusps 330A, 330B, and 330C. When light within a narrow frequency range is passed through the etalon, light frequencies which correspond to a peak 320A–B will exhibit a higher intensity than light frequencies which correspond to a cusp 330A–C.

In accordance with the present invention, a small input frequency change should produce an output amplitude change which can be detected by the associated circuitry in the path. Desirable operating frequencies are located between the peaks 320A–B and the cusps 330A–C, such as at location 350A or 350B, in order to maximize amplitude change as a function of frequency change. Operating at the peaks 320A–B is undesirable because small changes in frequency may cause a sign change in the slope of the output or may result in an amplitude which is above the desired operating range. Operating in the cusps 330A–C is undesirable because changes in frequency may produce very little change in the output, such as between points 360 and 370. In the preferred embodiment, the output amplitude 310 of the etalon is normalized to a reference amplitude 300, such that the etalon output amplitude 310 straddles the reference amplitude 300. In this arrangement, if the desired operating frequency occurs at location 350A, a drop in frequency from location 350A will result in an increase in the etalon output amplitude, indicating to the microcontroller 50 that a change in frequency has occurred so that the microcontroller 50 can adjust the laser 12. Similar processing would occur for an increase in frequency from location 350A.

If the desired operating frequency of the laser 12 corresponds to a cusp 330A–C, small changes in the output frequency of the laser 12 may be undetectable by the associated circuitry in the path. Therefore, in order to stabilize a laser 12 operating at a frequency that corresponds to a cusp 330A–C of the etalon, one or more etalon which exhibit interference patterns in which the peaks and cusps don't correspond to the peaks 320A–B and cusps 330A–C of the original etalon may be incorporate into the stabilization system 10 so that the microcontroller 50 can choose the etalon having the best amplitude to frequency change ratio for the desired frequency.

Figure 3B:
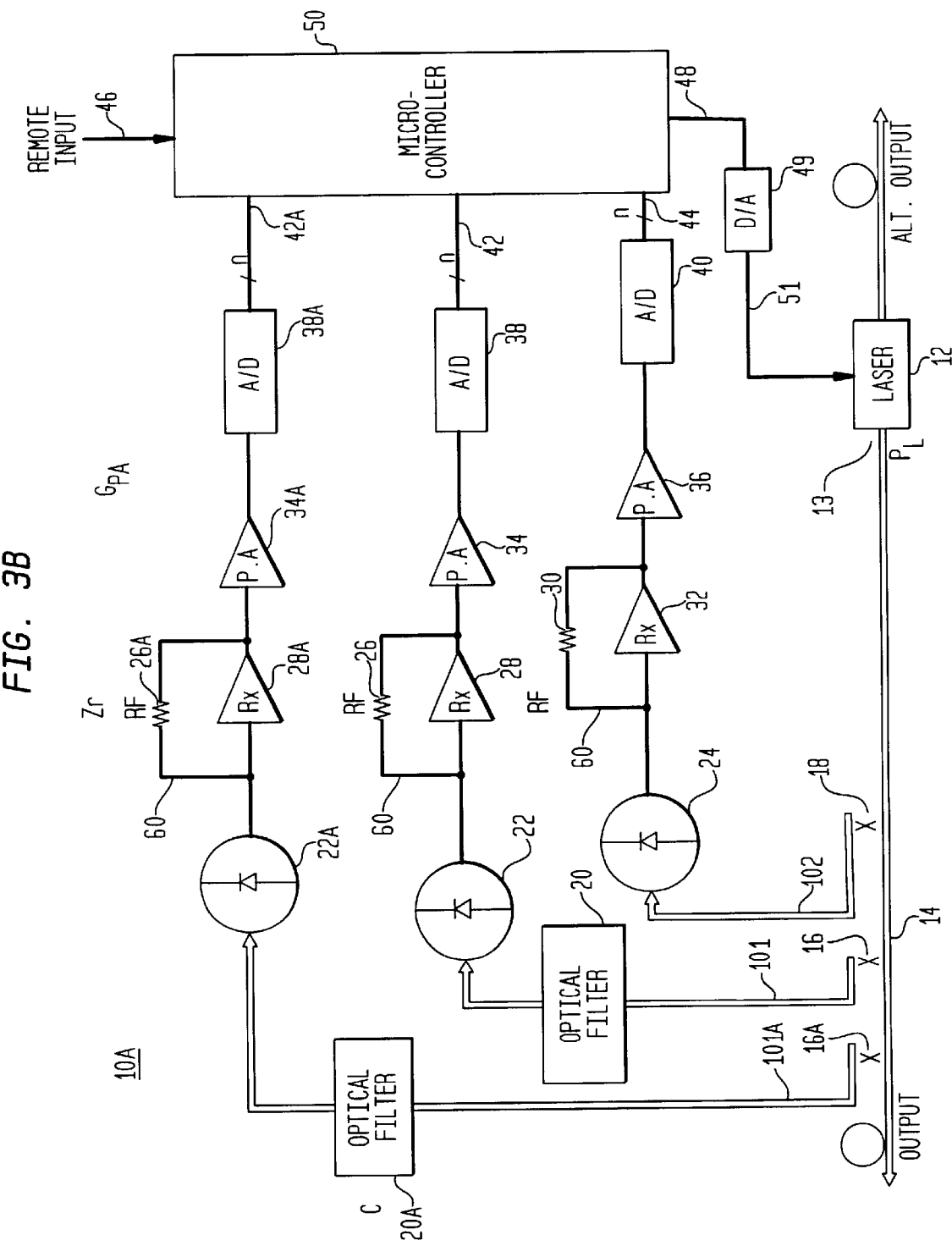
FIG. 3B is a block diagram of a multi-path wavelength stabilization system in accordance with the present invention.

The additional etalon may be incorporated into the stabilization system 10 as depicted in FIG. 3B, which illustrates an alternative embodiment of a multiple path wavelength stabilization system 10A. FIG. 3B is identical to FIG. 3 with the exception that an additional optical filtered path 101A is included. All of the components of optical filtered path 101A are similar to the corresponding components in optical filtered path 101. The additional optical filtered path 101A provides an additional reference path for use by microcontroller 50. The additional optical filtered path lOlA may be used to accommodate manufacturing variations in optical filters 20 and 20A. For example microcontroller 50 could base calculations on either optical filtered path 101 or 101A or microcontroller 50 could use a combination of the optical filtered paths 101 and 101A, based on the characteristics of the optical filtered paths 101 and 101A. Flexibility in the manipulation of optical filtered paths 101 and 101A can be incorporated with software in microcontroller 50. In addition to optical filtered paths 101 and 101A, additional optical filtered paths may be added without departing from the spirit of the present invention.

The additional optical filtered path 101A is developed and processed in a manner similar to optical filtered path 101. The output 13 from either the front face or the back face of the laser 12 produces a signal having a power $P_L$ which is placed on the fiber optic cable 14. The initial signal on the fiber optic cable is then used to create the optical filtered path 101A. The optical filtered path 101A is created by placing photo-coupler 16A on the fiber optic cable 14 carrying the signal from the laser 12. The optical filtered path 101A is passed through an optical filter 20A to obtain a signal which is, at least partially, a function of wavelength or frequency, and becomes a potential reference element for frequency stabilization. Optical filter 20A may be physically separate from optical filter 20, or optical filter 20A and optical filter 20 may be different portions of a multiple step or graduated optical filter, such as a two step etalon. In addition, more optical filters may be added or many different portions of a multiple step optical filter may be used to filter additional optical filtered paths without departing from the spirit of the present invention.

The optical filtered path 101A is then processed to provide a suitable signal for the microcontroller 50. The optical filtered path 101A passes through a photo-detector 22A, current-to-voltage converter 28A, amplifier 34A, and analog-to-digital converter 38A. The photo-detector 22A, transform the optical signal into an electrical signal which is required as an input for electrical circuits. The photo-detector 22A produces an electrical current which is a function of the optical signal strength. The current-to-voltage converter 28A converts the output of the photo-detector 22A from a signal represented by a current to one represented by a voltage and provide some pre-amplification. The amplifier 34A, provides gain to the signal to condition the signal for the analog-to-digital converter 38A. The analog-to-digital converter 38A converts the input analog signal to a digital signal. The resultant digital signal 42A is in a form which can be processed and manipulated by the microcontroller 50.

The digital signal 42A is then processed by the microcontroller 50 along with digital signals 42 and 44, to produces the output signal 48. The microcontroller 50 numerically manipulates optical filtered path digital signals 42 and 42A and the power reference path digital signal 44 to derive a digital value which is a function solely of the laser's wavelength. By using two optical filtered paths 42 and 42A, the effect of an undesirable value on one of the optical filtered paths can be accommodated by the microcontroller 50, and thereby negated. For example, microcontroller 50 may combine optical filtered paths 101 and 101A and use the power reference path to normalize the combined paths. Alternatively, microcontroller 50 could choose one of the two optical filtered paths and use the power reference path to normalize the chosen path. Various microcontroller 50 numerical manipulations for achieving a digital value which is a function solely of the laser's wavelength will be readily apparent to those skilled in the art. In addition, microcontroller 50 could base calculations on one or more of many optical filtered paths if additional optical filtered paths are incorporated into a wavelength stabilization system.

The microcontroller 50 can then use the digital value representing the laser's e wavelength to generate signal 48. Signal 48 is then converted from digital to analog by digital-to-analog converter 49 to produce a laser adjustment signal 51 which can be used for adjusting the wavelength of the laser 12.

The present invention teaches a multiple path digital wavelength stabilization method to achieve a level of wavelength stabilization that is impractical or impossible via analog means. For example, improved stabilization can be achieved by identifying small variations in the laser's wavelength. Small wavelength variations can be masked by noise in the laser 12 and stabilization circuitry 10. In order to increase the signal to noise ratio, the normalized signal can be integrated over a period of time, with improved signal to noise ratios resulting from longer integration periods. Traditional analog systems are constrained by an RC (resistance and capacitance) time constant. In order to obtain long integration times, such as a month, a capacitor the size of a trash can would be required. By using microcontroller 50, the signals can be sampled over a period of minutes, days, months, or even years, depending on the amount of time required to obtain a desirable signal to noise ratio. The microcontroller can accomplish long integration times by storing signal values in memory or keeping a running total of averages digitally.

Additionally, the digital approach to wavelength stabilization allows for flexibility in choosing system components. Different types of filters with varying characteristics can be used for optical filters 20 and 20A by modifying software in the microcontroller 50, without changing other system components. This allows for using inexpensive filters or incorporating new filter designs into stabilization circuits 10 and 10A. Also, photo-detectors 22, 22A, and 24, current-to-voltage converters 28, 28A, and 32, and amplifiers 34, 34A, and 35 can be chosen based on availability or cost with variations in their respective signal levels accommodated by software in the microcontroller 50. For example, if the optical filtered path digital signal 42 was twice as big as the power reference path digital signal 44, due to mismatched components, the microcontroller 50 could divide the optical filtered path 42 by two or multiply the power reference path 44 by two. Attempting system modifications such as this, although readily achievable with a microcontroller, would require almost completely redesigning a circuit to accomplish in an analog system.

Further, this method of wavelength stabilization allows for the use of components with high levels of manufacturing variations, permitting the use of less expensive components. Variations in system components can be accommodated by changing software code in the microcontroller 50, either at the factory when the laser's frequency is originally set, or via remote input 46 at a later date. The microcontroller 50 software can numerically account for amplifier component variations resulting in digital signal levels that are too high or too low, filters with varying wavelength characteristics, and other types of system variations. Attempting similar flexibility in an analog system would require exhaustive design considerations.

The wavelength stabilization systems according to the present invention offers vast improvements over traditional stabilization systems. As stated above, long integration times, which were previously impractical because of unrealizable component values, flexibility in choosing system components, and accommodation of manufacturing variations in the optical filters and other components, are all easily achievable utilizing digital stabilization in accordance with the present invention. The flexibility gained by using the new stabilization system is due to the ability to program the microcontroller 50 to perform many different functions on the digital inputs with software using mathematical equations, versus attempting to use analog circuit components to accomplish the same type of functions in an analog system. In addition, the remote input 46 can be used to modify software code in the microcontroller 50. For example, various control algorithms or normalization methods can be used or changed at will via code changes in the microcontroller 50 via remote input 46.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method for stabilizing the wavelength of a laser source, the method comprising the steps of:

photo-coupling a first path from an output of a laser and passing said first path through a first optical filter to derive a first optical signal;

photo-coupling a second path from the output of said laser and passing said second path through a second optical filter to derive a second optical signal;

photo-coupling a third path from the output of said laser to derive a third optical signal;

converting the optical signal from said first path, the optical signal from said second path, and the optical signal from said third path to electrical signals;

converting the electrical signal from said first path, the electrical signal from said second path, and the electrical signal from said third path from analog-to-digital; and using a microcontroller to process said first path digital signal, said second path digital signal, and said third path digital signal to determine frequency variations in the output of said laser, and develop a signal capable of adjusting the output of said laser.

2. The method of claim 1, wherein:

said microcontroller selects either said first digital path or said second digital path and uses said third digital path to normalize the selected digital path.

3. The method of claim 2, wherein said microcontroller selects either said first digital path or said second digital path based on amplitude versus frequency change characteristics of said first and second digital paths.

4. The method of claim 3, wherein;

said first path and said second path are passed though said first optical filter and said second optical filter, respectively, to obtain signals the power of which are a function of power and frequency; and said third path is not passed through a filter, resulting in a signal the power of which is a function of power, but not frequency;

such that said microcontroller can use said third path to determine if a change in power from said first path or said second path is due to a change in frequency or is due to a change in the power of the laser.

5. The method of claim 1, wherein:

said microcontroller uses said third digital path to normalize the combination of said first digital path and said second digital path.

6. The method of claim 5, wherein;

said first path and said second path are passed though said first optical filter and said second optical filter, respectively, to obtain signals the power of which are a function of power and frequency; and said third path is not passed through a filter, resulting in a signal the power of which is a function of power, but not frequency;

such that said microcontroller can use said third path to determine if a change in power from said first path or said second path is due to a change in frequency or is due to a change in the power of the laser.

7. The method of claim 1, further comprising:

amplifying the electrical signals from said first, second, and third paths.

8. The method of claim 1, further comprising:

converting the electrical signals from said first, second, and third paths from current to voltage.

9. The method of claim 8, further comprising:

amplifying the electrical signals from said first, second, and third paths.

10. The method of claim 1, further comprising:

converting the output of said microcontroller from digital to analog.

11. The method of claim 1, wherein:

said microcontroller comprises means for updating software code.

12. An apparatus for stabilizing the wavelength of a laser source, the apparatus comprising:
- a laser source having an output;
- first, second, and third optical paths coupled from the output of said laser;
- a first optical filter positioned within said first optical path;
- a second optical filter positioned within said second optical path;
- a first photo-detector coupled to the output of said first optical filter in said first optical path;
- a second photo-detector coupled to the output of said second optical filter in said second optical path;
- a third photo-detector coupled to said third optical path;
- first, second, and third analog-to-digital converters attached to the output of said first, second, and third photo-detectors, respectively; and
- a microcontroller with inputs connected to the outputs of said first, second, and third analog-to-digital converters, said microcontroller having means for processing data at the inputs to determine frequency variations in the output of said laser and generate a signal for controlling said laser responsive thereto.

13. The apparatus of claim 12, wherein;
- said first and second optical path are passed though said first and second optical filters, respectively, to obtain signals the power of which are a function of power and frequency; and
- said third optical path is not passed through a filter, resulting in a signal the power of which is a function of power, but not frequency;
- such that said microcontroller can use said third path to determine if a change in power from said first path or said second path is due to a change in frequency or is due to a change in the power of the laser.

14. The apparatus of claim 12, further comprising:
- a first current-to-voltage converter electrically connected between said first photodetector and said first analog-to-digital converter, a second current-to-voltage converter electrically connected between said second photo-detector and said second analog-to-digital converter, and a third current-to-voltage converter electrically connected between said third photo-detector and said third analog-to-digital converter.

15. The apparatus of claim 14, further comprising:
- a first amplifier electrically connected between said first current-to-voltage converter and said first analog-to-digital converter, a second amplifier electrically connected between said second current-to-voltage converter and said second analog-to-digital converter, and a third amplifier electrically connected between said third current-to-voltage converter and said third analog-to-digital converter.

16. The apparatus of claim 12, further comprising:
- a first amplifier electrically connected between said first photo-detector and said first analog-to-digital converter, a second amplifier electrically connected between said second photo-detector and said second analog-to-digital converter, and a third amplifier electrically connected between said third photo-detector and said third analog-to-digital converter.

17. The apparatus of claim 16, further comprising:
- a first current-to-voltage converter electrically connected between said first photodetector and said first amplifier, a second current-to-voltage converter electrically connected between said second photo-detector and said second amplifier, and a third current-to-voltage converter electrically connected between said third photo-detector and said third amplifier.

18. The apparatus of claim 12, wherein:
- said generated signal is converted from digital to analog by a digital-to-analog converter.

19. The apparatus of claim 12, wherein:
- said microcontroller comprises means for updating software code.

20. The apparatus of claim 12, wherein:
- said first optical filter corresponds to a first portion of a multiple step optical filter and said second optical filter corresponds to a second portion of said multiple step optical filter.

21. The apparatus of claim 20, wherein:
- said multiple step optical filter is an etalon.

22. The apparatus of claim 12, wherein:
- said means for processing data comprises using said microcontroller to select either the output of said first analog-to-digital converter or the output of said second analog-to-digital converter and use the output of said third analog-to-digital converter to normalize the selected analog-to-digital converter output.

23. The apparatus of claim 22, wherein said microcontroller selects either the output of said first analog-to-digital converter or the output of said second analog-to-digital converter based on amplitude versus frequency change characteristics.

24. The apparatus of claim 12, wherein:
- said means for processing data comprises using said microcontroller to normalize the combination of the output of said first analog-to-digital converter and the output of said second analog-to-digital converter with the output of said third analog-to-digital converter.

25. A method for stabilizing the wavelength of a laser source, the method comprising the steps of:
- photo-coupling a plurality of filtered paths from an output of a laser and passing said plurality of filtered path through a plurality of optical filters to derive a plurality of filtered optical signals;
- photo-coupling a normalization path from the output of said laser to derive a normalization optical signal;
- converting said plurality of filtered optical signals and said normalization optical signal to electrical signals;
- converting the electrical signal from said plurality of filtered paths and the electrical signals from said normalization path from analog-to-digital; and
- using a microcontroller to process said plurality of filtered paths digital signals and said normalization path digital signal to determine frequency variations in the output of said laser, and develop a signal capable of adjusting the output of said laser.

26. The method of claim 25, wherein:
- said microcontroller selects one of said plurality of filtered paths and uses said normalization path to normalize the selected filtered path.

27. The method of claim 26, wherein said microcontroller selects said one of said plurality of filtered paths based on amplitude versus frequency change characteristics.

28. The method of claim 25, wherein:
- said microcontroller uses said normalization path to normalize said plurality of filtered paths.

29. The method of claim 28, wherein:

said filtered paths are paths which pass though one or more optical filters to obtain signals the power of which are a function of power and frequency; and said normalization path does not passed through a filter, resulting in a signal the power of which is a function of power, but not frequency;

such that said microcontroller can use said normalization path to determine if a change in power from one or more filtered paths is due to a change in frequency or is due to a change in the power of the laser.

30. An apparatus for stabilizing the wavelength of a laser source, the apparatus comprising:

a laser source having an output;

a normalization optical path coupled to the output of said laser;

a plurality of optical filter paths coupled from the output of said laser;

a plurality of optical filters positioned within said plurality of optical filter paths;

a plurality of optical filter path photo-detectors coupled to the output of said plurality of optical filter paths;

a normalization path photo-detector coupled to said normalization optical path;

a plurality of optical filter path analog-to-digital converters attached to the output of said plurality of optical filter path photo-detectors a normalization path analog-to-digital converter attached to the output of said normalization path photo-detector; and a microcontroller with inputs connected to the outputs of said plurality of optical filter path analog-to-digital converters and the output of said normalization path analog-to-digital converter, said microcontroller having means for processing data at the inputs to determine frequency variations in the output of said laser and generate a signal for controlling said laser responsive thereto.

31. The apparatus of claim 30, wherein:

said plurality of optical filters comprise a plurality of locations on a single multiple step optical filter.

32. The apparatus of claim 31, wherein:

said single multiple step optical filter is an etalon.

33. The method of claim 30, wherein:

said microcontroller selects the output of one of said plurality of optical filter path analog-to-digital converters and uses the output of said normalization path analog-to-digital converter to normalize the output of the selected one of said plurality of optical filter path analog-to-digital converters.

34. The method of claim 33, wherein said microcontroller selects the output of one of said plurality of optical filter path analog-to-digital converters based on amplitude versus frequency change characteristics.

35. The method of claim 30, wherein:

said microcontroller uses the output of said normalization path analog-to-digital converter to normalize the combination of the outputs of said plurality of optical filter path analog-to-digital converters.

\* \* \* \* \*